United States Patent
Landa

[19]

[11] Patent Number: 5,883,572
[45] Date of Patent: Mar. 16, 1999

[54] ROAD SAFETY SYSTEM FOR VEHICLES EMPLOYING-BUILT-IN DRIVING INFORMATION

[76] Inventor: Jose Antonio Arteagoitia Landa, C/O Alameda Mazarredo 3-4 A, Bilbao, Spain, 48001

[21] Appl. No.: 857,506

[22] Filed: May 16, 1997

[30] Foreign Application Priority Data

May 17, 1996 [ES] Spain ..................................... 9601294

[51] Int. Cl.$^6$ ...................................................... B60Q 1/40
[52] U.S. Cl. ......................... 340/467; 340/464; 340/472; 340/479
[58] Field of Search ..................................... 340/463, 464, 340/466, 467, 468, 469, 471, 472, 479, 691

[56] References Cited

U.S. PATENT DOCUMENTS

| | | | |
|---|---|---|---|
| 3,478,312 | 11/1969 | Lee | 340/467 |
| 5,481,243 | 1/1996 | Lurie et al. | 340/479 |
| 5,610,578 | 3/1997 | Gilmore | 340/479 |

*Primary Examiner*—Daniel J. Wu
*Attorney, Agent, or Firm*—Finnegan, Henderson, Farabow, Garrett & Dunner, L.L.P.

[57] ABSTRACT

A road safety system for vehicles employing built-in driving information, wherein it regards the conduct adopted by drivers when driving their vehicles as being manifested in the displacement of the accelerator pedal by pressure thereon, that having gathered this information and the indication of the normal/fog selector, it is conveyed to the position detector, and the output therefrom through a linking cable to the receiving module so as to illuminate an elongate luminous strip, installed in the rear part of the vehicle, so as to be visible to other drivers under the criteria which define the manner in which to illuminate, for the fully depressed or raised positions of the pedal, the whole of the green or red strip respectively, for intermediate positions, green and red patches, green indicating the proportional displacement of the pedal and red the difference to make up the strip.

3 Claims, 2 Drawing Sheets

ROAD SAFETY SYSTEM FOR VEHICLES EMPLOYING-BUILT-IN DRIVING INFORMATION

Competitiveness and new technologies are bringing technological development to bear also on THE AUTOMOBILE SECTOR, with the development of ever more powerful and increasingly fast vehicles, sometimes making them more difficult to control on account of their characteristics and the REDUCTION IN THE REACTION TIME available from the time of receiving a danger signal from another vehicle until it is assimilated. The above system has been developed in order to solve the problem, employing built-in information for other drivers, regarding the driving of the driver of a vehicle, enabling them continuously to monitor and predict the various situations which arise during driving.

Drivers drive in accordance with the road on which they are traveling, the circumstances of time and traffic, their vehicle and the INFORMATION RECEIVED FROM THE DRIVING OF THE DRIVERS OF THE CLOSEST VEHICLES. Of all these factors it is the last which is of greatest impact and holds sway as regards the decisions of drivers as they affect themselves and third parties.

Each of us interprets the same occurrence in our life in a different way, and likewise as regards the driving of vehicles, but in this case we manifest it in terms of the ACCELERATOR and BRAKE PEDALS. Although the information received from the brake pedal may have been sufficient hitherto, it is no longer so, and it is necessary to gather the information afforded by the displacements of the accelerator pedal throughout the time of driving, and transmit it via optical signals to other drivers, causing them to take precautions on the basis of the information they receive, increasing their safety and that of those who transmit it.

If through an electronic system, with real-time response on a screen or elongate luminous strip installed in the rear part of our vehicle, we are able to inform other drivers of our conduct continuously while driving, they will adopt new measures, matching their driving to the maximum need for safety.

With this device drivers looking at us receive the information about our driving, through green/red luminous strips proportional to the displacements of the accelerator pedal.

The system PROTECTS against a possible accident both to the VEHICLE ON WHICH IT IS INSTALLED and also THE VEHICLES WHICH VIEW IT through the information that the former affords to the others.

ADVANTAGES OF THE SYSTEM

The system installed on a vehicle offers, among other things, the following advantages:

To drivers looking at it, it provides REAL-TIME INFORMATION regarding the conduct adopted by the driver in whose vehicle it is installed, enabling them to analyze and adopt measures geared toward taking precautions, INCREASING THEIR SAFETY and that of the vehicles traveling closeby.

The presence of a variable luminous strip in the rear part of the vehicles will mean that DRIVING IS MORE ATTENTIVE and therefore LESS MONOTONOUS and SAFER.

The information provided by the system is continuous and available in REAL TIME, that is to say much faster than what we receive from brake lights, thus enabling us to predict a danger situation and react much faster, AVOIDING DANGER SITUATIONS AND COLLISIONS AT RANGE. Furthermore, the redundancy of systems will guarantee the information to other drivers.

Installation of the system in the rear part of vehicles will mean that they are EASIER TO SEE, preventing them from merging into the road on account of their being similar in color to the roadway or on account of fog.

On lengthy straight roads when a vehicle is moving in the same direction as and away from ours, or is approaching from the opposite direction, and especially when passing, the system will provide us with the information regarding the vehicle on which it is installed, INDICATING whether it is traveling in the SAME DIRECTION as or in the OPPOSITE DIRECTION to us, since in one case we shall see the variable luminous strip but not in the other.

When we request that the driver of the vehicle in front increase his speed or give way to us, WE ALTER HIS DRIVING. If through this system we see that his level of acceleration is high we shall not request that he increase his speed, since he is unable, and we shall adopt a waiting posture and move forward at some other more suitable occasion, thus AVOIDING a situation of danger, with a HIGH RISK OF ACCIDENT.

The vehicles of FIRMS who adopt this system will be more ATTRACTIVE FROM THE SELLING STANDPOINT, since it is a technologically advanced and ultramodern external sign which is generally liked by customers.

SYSTEM DEVELOPMENT

The electronic system is developed with solid-state semiconductors so that the response is not delayed by more than a few milliseconds, since otherwise the system would be ineffective.

Figure 1:
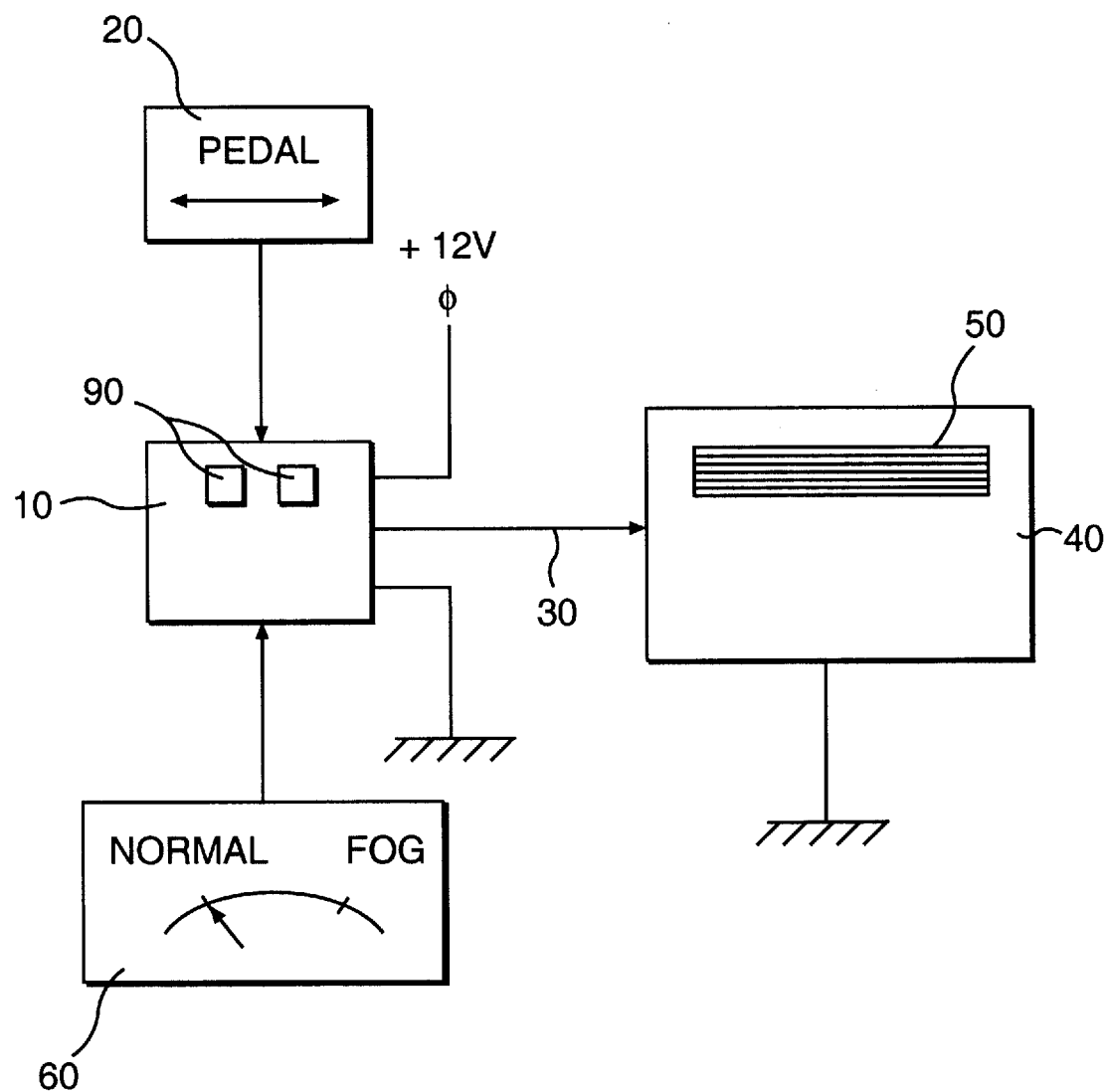
FIG. 1 shows a functional diagram of an electronic built-in safety system according to an embodiment of the present invention.
Figure 2A:
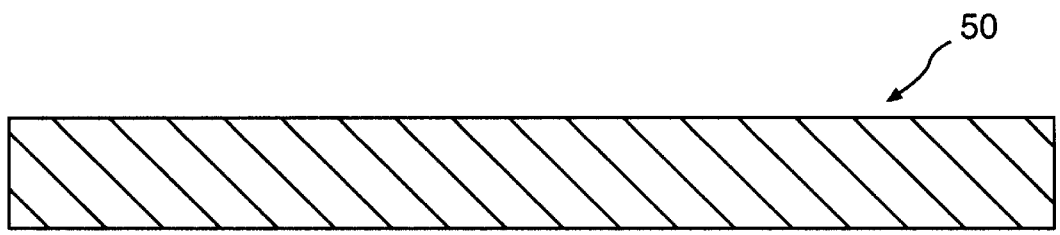
FIGS. 2(a)–2(e) show screen display of the system shown in FIG. 1.
Figure 2B:
Figure 2C:
Figure 2D:
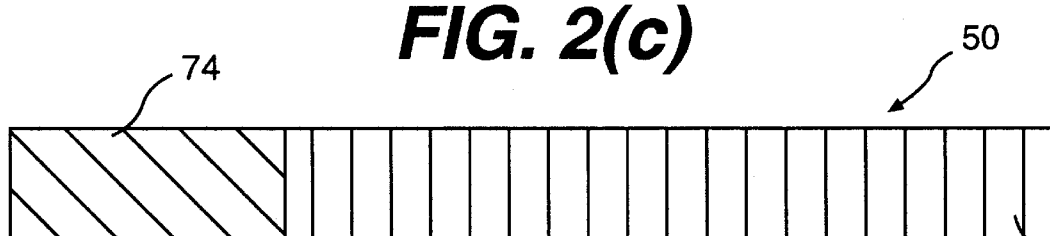
Figure 2E:
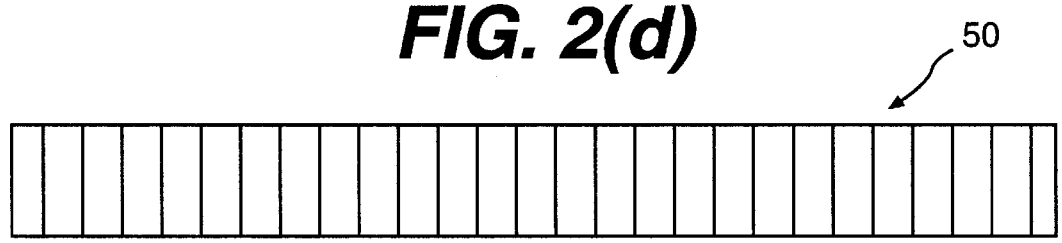

FIG. 1 shows a functional diagram of an electronic built-in safety system according to an embodiment of the present invention. The principle of operation (FIG. 1) is as follows:

Using a position indication detector 10 installed in the engine compartment or beside the accelerator pedal 20, we monitor the movements of the accelerator pedal 20 and, depending on its position and via a link cable 30, we convey this information to a module 40 with a small elongate and narrow screen 50 installed in the rear part of the vehicle.

The detector 10 receives the information as to the various positions of the accelerator pedal 20, utilizing the displacement experienced by the accelerator cable or rod which, through the appropriate mechanism with magnetic, optical, physical etc. sensor elements, continuously guarantees us the information on its position. It also receives the information from the normal or fog position selector 60. The position detector 10 may include one or more magnetic, optical, physical, or other like position sensors 90 to aid in transmission of information.

The screen 50 will be able to consist of luminous elements such as: LED DIODES, INCANDESCENT LAMPS, LIQUID CRYSTAL, etc., which will light up depending on the information received from the position detector 10. FIGS.

2(a) to 2(e) show screen 50 displaying green and/or red portions depending on the information received from the position detector. The screens 50 have been cross-hatched to indicate green (diagonal cross-hatching) or red (vertical cross-hatching).

1. As upper limit, if the information received corresponds to the adjustable position of the pedal being sufficiently accelerated or fully depressed, the whole of the green colored luminous strip 50 will light up, as shown in FIG. 2(*a*), indicating the normal high-speed situation.

2. Conversely, when the information detected corresponds to a very sudden deceleration or to the adjustable, very slightly accelerated or raised position of the pedal, the whole of the adjustable red or intense red colored luminous strip 50 will light up, as shown in FIG. 2(*e*), indicating the position of alert.

3. If the information received by the receiver from the accelerator pedal 20 corresponds to a position intermediate between the two previous cases, the luminous strip 50 will light up, one patch colored green and the remainder colored red. The sum of the two color patches will span the entire length of the luminous strip 50, the green color being the one which indicates in a proportional manner the displacement of the accelerator pedal. For example, as shown in FIG. 2(*b*), luminous strip 50 includes a first green portion 70 occupying about 75% of strip 50 and a red portion 80 occupying about 25% of strip 50 to indicate about 75% displacement of the accelerator pedal. Similarly, FIG. 2(*c*) shows luminous strip 50 with a green portion 72 occupying about 50% of strip 50 and a red portion 82 occupying about 50% of strip 50 to indicate about 50% displacement of the accelerator pedal, and FIG. 2(*d*) shows luminous strip 50 with a green portion 74 occupying about 25% of strip 50 and red portion 84 occupying about 75% of strip 50 to indicate about 25% displacement of the accelerator pedal.

We shall control the luminous intensity by varying the current through the luminous elements 50, it being adjustable for NORMAL or FOGGY operation by selector 60, in the first instance it will be adjusted automatically with the dipped headlight controls, depending on whether traveling by day or at night, in the second case, foggy, the accelerator pedal position indicator 10 is automatically disconnected and will operate only in respect of INTENSE RED illumination adjusted for fog, indicating a permanent alert.

It also offers a potential SAVING since it makes it possible to dispense with the INTENSE RED colored optical position monitoring and indication currently installed in the rear part of vehicles so as to be viewed when traveling in fog.

It will be endeavored to avoid mechanical actuation in all these mechanisms, replacing it by electrical or electronic actuation, so as to obtain sizable gains in terms of reliability and maintenance.

I claim:

1. A road safety system for a vehicle having an accelerator pedal, the system employing built-in driving information and comprising:

an accelerator pedal position detector for coupling to an accelerator pedal;

a normal/fog selector coupled to the position detector; and a receiving module linked to the position detector via a linking cable, the module having a luminous strip, wherein the system uses conduct adopted by a driver when driving a vehicle as being manifested in a displacement of an accelerator pedal by pressure thereon, and wherein the system obtains information relating to a displacement of an accelerator pedal and an indication of the normal/fog selector into the position detector, and an output from the position detector is conveyed through the linking cable to the receiving module so as to illuminate the luminous strip according to the information, the strip capable of being installed in the rear part of a vehicle so as to be visible to other drivers.

2. The road safety system as claimed in claim 1 wherein the information transmitted to other drivers via illumination of the luminous strip is real-time and continuous throughout driving, illumination of the strip including variations in green and red lengths of luminous patches which contrast sufficiently within the luminous strip, criteria which defines illumination of the green and red lengths of patches including a) as an upper limit, if the information received corresponds to an adjustable position of an accelerator pedal being sufficiently depressed, the whole of the luminous strip will light up green, indicating a normal high-speed situation;

b) when the information received corresponds to a very sudden deceleration or to an adjustable position of an accelerator pedal being very slightly depressed or raised, the whole of the luminous strip will light up red, indicating a position of alert; or c) if the information received corresponds to a position of an accelerator pedal intermediate cases a) and b), the luminous strip will light up, one patch colored green and a second patch colored red, the two patches spanning an entire length of the luminous strip, the green patch indicating in a proportional manner a displacement of an accelerator pedal.

3. The road safety system as claimed in claim 1 wherein the information relating to a displacement of an accelerator pedal is obtained by utilizing elements available in current vehicles, from the electronic circuits, or from displacement experienced by a cable or rod which connects an accelerator pedal to an engine in order to accelerate or decelerate a vehicle, the information being sent to an optical signal receiver and sender module that includes a) position sensor elements which will not cause major delays in transmission of the information, the position sensor elements being located in the position detector, b) luminous elements of the luminous strip which do not cause major delays in optical transmission of the information, the luminous elements being located in the receiving module, and c) insulated conductors in the linking cable so as to comply with regulations in the automobile industry.

* * * * *